United States Patent [19]

Ruiz

[11] Patent Number: 4,779,180
[45] Date of Patent: Oct. 18, 1988

[54] ARRANGEMENT FOR FASTENING A GLASS IN A BULKHEAD LIGHT FITTING

[76] Inventor: Francisco N. Ruiz, Calle Miguel Bleach Nr. 6, Barcelona, Spain

[21] Appl. No.: 118,193

[22] Filed: Nov. 6, 1987

[30] Foreign Application Priority Data

Nov. 7, 1986 [ES] Spain .................................. 86 01138

[51] Int. Cl.⁴ ............................................. F21V 17/06
[52] U.S. Cl. .................... 362/433; 248/488; 362/306; 362/362; 362/375; 362/455
[58] Field of Search ............... 362/306, 362, 375, 433, 362/455, 457; 248/488

[56] References Cited

U.S. PATENT DOCUMENTS

| 354,629 | 12/1886 | Dressel | 362/375 |
| 1,781,729 | 11/1930 | Major | 362/455 |
| 2,481,531 | 9/1949 | Phillips | 362/375 |
| 2,951,668 | 9/1960 | Peterka | 248/488 |

FOREIGN PATENT DOCUMENTS 1455162 11/1976 United Kingdom ................ 248/488

Primary Examiner—Douglas Hart
Attorney, Agent, or Firm—Flynn, Thiel, Boutell & Tanis

[57] ABSTRACT

An arrangement for fastening a glass in a bulkhead lighting fitting, wherein three small columns are fixed with and project perpendicularly from the bulkhead fitting and are arranged substantially at the apices of an equilateral triangle. The small columns each include a sidewardly opening groove to accommodate an edge of the removable glass. One of the small columns has a rotary head movable between open and closed positions, the head when in the open position permitting the glass to be moved downwardly into the groove, whereupon rotation of the head into the closed position results in the edge of the glass being confined within the groove.

1 Claim, 2 Drawing Sheets

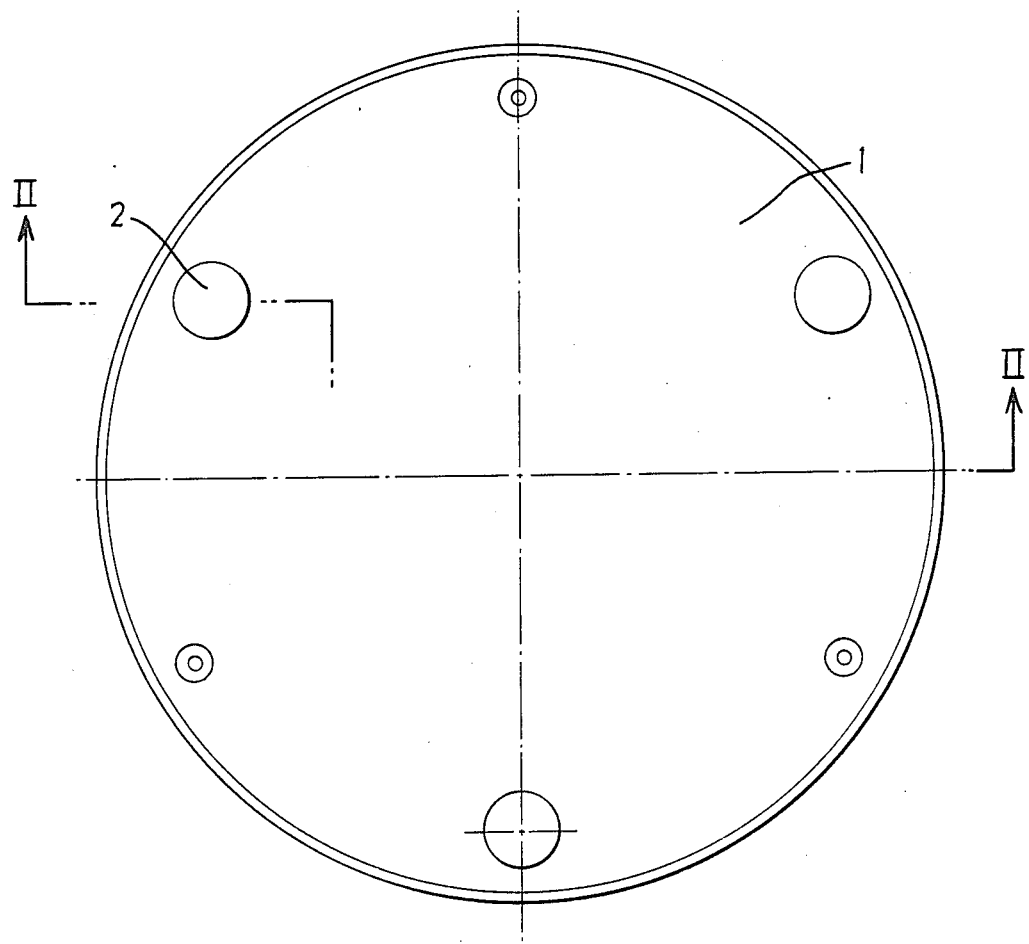
FIG. I
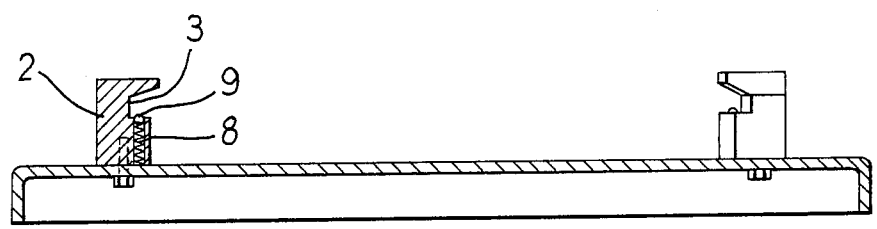
FIG. 2

ARRANGEMENT FOR FASTENING A GLASS IN A BULKHEAD LIGHT FITTING

The present invention relates to an improved arrangement for fastening a glass in a bulkhead light fitting.

More specifically, the invention relates to an arrangement specially designed to improve the fastening of the glass in wall fittings or bulkhead light fittings, preferably for ceilings.

In general, the arrangement envisaged has three small columns integral with the bulkhead fitting, situated at the apices of a virtual equilateral triangle and provided with inwardly-opening grooves to receive the edge of the glass. To facilitate the positioning of the glass, one of the small columns has a mobile head disposed rotatably on an eccentric shaft. Each small column also has elastic means to compensate for the thickness of the glass and thereby provide a fastening without gaps.

In order to facilitate the explanation, there is enclosed with the present specification two sheets of drawings, in which there is shown an embodiment described by way of example in the following description.

In the drawings:

FIG. 1 is a plan view of the bulkhead fitting;

FIG. 2 is a sectional view of the bulkhead fitting substantially along the line II—II;

DETAILED DESCRIPTION

Figure 3:
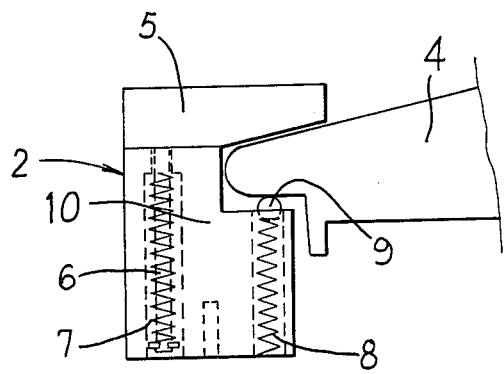
FIG. 3 is an enlarged side view of the small column provided with a mobile head and shown in the closed position.

Referring to the drawings, there is shown a wall or bulkhead fitting which includes a substantially flat fitting plate 1 of generally circular configuration, the plate having an annular rim in the illustrated embodiment. This fitting plate has a plurality, three in the illustrated embodiment, of small columns 2 projecting outwardly from the fitting plate in a generally cantilevered relationship. These columns are fixed to the fitting plate by any suitable manner, such as by screws or rivets, and are disposed adjacent the periphery of the plate in substantially uniformly angularly spaced relationship therearound. Each of these columns 2, in the vicinity of the free end thereof, has a sidewardly opening slot or groove 3 formed therein, which grooves face generally radially inwardly toward the center of the fitting plate. These grooves 3 are designed to accommodate the edge of a glass 4. The glass 4 may be of circular outer configuration and functions as a diffuser for the bulkhead or ceiling light fitting.

To facilitate positioning of the edge of the glass 4 within the grooves 3 defined in the small columns 2, one of the small columns has a movable head or top plate 5.

Figure 4:
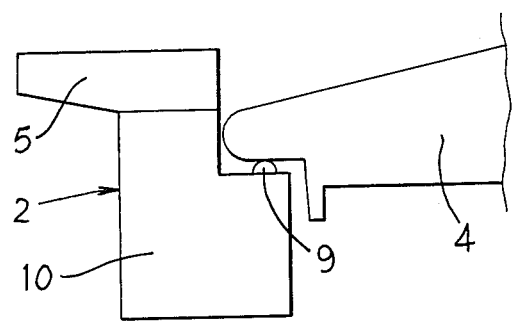
FIG. 4 is a view similar to FIG. 3 but showing the head in the open position.

As illustrated by FIGS. 3 and 4, this particular column has a lower part 10 which is fixed to the fitting plate 1 and which has the head plate 5 movably, and more specifically rotatably, secured thereto. For this purpose, a shaft 6 is secured to the top plate 5 and projects downwardly therefrom so as to be rotatably disposed within an opening formed in the base part 10. A spring 7 surrounds the shaft 6 and is confined between a pin on the lower end of the shaft, and an upper shoulder formed on the part 10, so as to continuously urge the top plate 5 downwardly into engagement with the support part 10. This shaft 6 is spaced adjacent the radially outer edge of the support part 10, and is eccentrically displaced from its central longitudinal axis, to facilitate the rotational swinging movement of the top plate 5 between the closed and open positions illustrated in FIGS. 3 and 4 respectively.

As indicated by FIG. 3, the groove 3 formed in the column 2 having the movable top plate 5 is defined directly adjacent the free end of the support part 10, whereby one side of the groove 3 is defined by the underside of the top plate 5. By thus moving the top plate 5 into the open position illustrated by FIG. 4, this hence results in the respective groove 3 opening directly outwardly through the free end of the respective small column to permit the edge of the glass 4 to be moved directly into the groove from the free end of the column, rather than requiring the glass edge to be sidewardly fitted into the groove.

Each of the columns 2 has a spring-urged holding element 9, specifically a ball urged by a spring 8, which is urged sidewardly of the respective groove 3 to engage the underside of the glass 4 to thus snugly hold the edge of the glass within the respective groove.

To position the glass 4 on the fitting, the top plate 5 on the one support 2 is manually rotated about 180° into the open position illustrated in FIG. 4. The edge of the glass 4 is then moved sidewardly into the grooves 3 associated with the two columns 2 which do not have movable top plates, following which the remaining side edge of the glass 4 is then moved axially downwardly into the groove of the remaining column 2 substantially as illustrated by FIG. 4. Top plate 5 is then rotated into the closed position illustrated by FIG. 3, whereby the glass 4 is then totally and securely captivated by the three columns 2.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An improved arrangement for fastening a removable glass in a bulkhead light fitting, comprising three small columns fixed with and perpendicular to the bulkhead fitting and arranged at the apices of a virtual equilateral triangle, which small columns each include a sidewardly opening groove to receive the edge of the removable glass, one of said small columns being provided with a rotary head on an eccentric shaft, capable of positioning itself stably owing to a pressure spring to facilitate the positioning and extraction of said glass, which in its operational position is held fixedly in its grooves by means of an elastic catch of the type consisting of a floating ball supported by a spring incorporated in the respective small column.

* * * * *